United States Patent [19]

Capers et al.

[11] Patent Number: 5,388,407
[45] Date of Patent: Feb. 14, 1995

[54] EXHAUST MANIFOLD CATALYST AND MUFFLER FOR AUTOMOTIVE ENGINE

[75] Inventors: Walter E. Capers, Orchard Lake Village; Christopher J. Morris, Ypsilanti, both of Mich.

[73] Assignee: Ford Motor Company, Dearborn, Mich.

[21] Appl. No.: 270,872

[22] Filed: Jul. 5, 1994

[51] Int. Cl.$^6$ ............................................. F01N 3/20
[52] U.S. Cl. ........................................ 60/302; 60/323; 60/324
[58] Field of Search .................. 60/288, 300, 302, 311, 60/323, 324, 313; 422/176

[56] References Cited

U.S. PATENT DOCUMENTS

| | | |
|---|---|---|
| 3,201,106 | 8/1965 | Wawrziniok . |
| 3,247,666 | 4/1966 | Behrens . |
| 3,441,381 | 4/1969 | Keith ..................... 60/302 |
| 3,712,030 | 1/1973 | Priest ..................... 60/288 |
| 3,783,619 | 1/1974 | Alquist . |
| 3,786,635 | 1/1974 | Kates ..................... 60/302 |
| 3,826,067 | 7/1974 | Wilder .................... 60/311 |
| 3,937,015 | 2/1976 | Akado et al. . |
| 3,972,184 | 8/1976 | Warren . |
| 4,663,934 | 5/1987 | Sickels . |
| 5,192,597 | 3/1993 | Forsythe . |

Primary Examiner—James C. Yeung
Assistant Examiner—Daniel J. O'Connor
Attorney, Agent, or Firm—Jerome R. Drouillard; Roger L. May

[57] ABSTRACT

An exhaust manifold catalytic reactor and muffler for an automotive internal combustion engine includes at least one exhaust branch for conducting exhaust gases from the cylinder head exhaust ports of an engine to a hollow, generally cylindrical primary catalyst substrate for treating the exhaust gases flowing from the engine. The substrate has inner and outer surfaces which are generally cylindrical and which define an inner cavity. A housing connected to the exhaust branch places the exhaust gases in contact with the substrate and includes a generally cylindrical container having an outer wall and a transition section conducting the exhaust gases from the branch to the outer surface of the substrate such that the initial flow of the gases from the branch to the outer surface of the substrate such that the initial flow of the gases from the substrate is generally tangential. The outer wall has an inside surface which, together with the outer surface of the substrate, defines an annular gas flow passage which has a area which gradually decreases as the circumferential distance from the transition increases.

15 Claims, 3 Drawing Sheets

EXHAUST MANIFOLD CATALYST AND MUFFLER FOR AUTOMOTIVE ENGINE

FIELD OF THE INVENTION

The present invention relates to a combination exhaust manifold and catalytic reactor and muffler for an automotive internal combustion engine in which exhaust gases flowing from the engine are subjected to catalysis and also muffled prior to being introduced to the remaning portions of the vehicle's exhaust system.

BACKGROUND OF THE INVENTION

Those skilled in the art will appreciate that a variety of exhaust manifolds, catalysts and mufflers have been used in automotive vehicles. Although designers have attempted to combine a catalyst with an exhaust manifold, as shown in U.S. Pat. No. 3,937,015 (Akado et al.), and other cited references, such designs are generally not compact and therefore lacking in usefulness under the hoods of modern automotive vehicles in which space is at a premium. A system according to the present invention provides superior processing of exhaust gases due to the turbulent flow through the substrate, as well as exhaust noise attenuation capability. The present system provides improved gas treatment because the design provides greater catalytic surface area and the gases are carefully guided through the catalytic element such that the flow of exhaust gases passes evenly through the substrate, providing superior treatment results.

SUMMARY OF THE INVENTION

An exhaust manifold catalytic reactor and muffler for an automotive internal combustion engine includes at least one exhaust branch for conducting exhaust gases from a cylinder head exhaust port of an engine, and a hollow, porous, generally cylindrical primary catalyst substrate for treating the exhaust gases flowing from the engine, with the substrate having inner and outer surfaces which are generally cylindrical, we well as an inner cavity. The combined catalyst and manifold muffler further includes a housing connected to the exhaust branch for placing the exhaust gases in contact with the outer surface of the substrate. The housing comprises a generally cylindrical container having an outer wall and a transition section for conducting exhaust gas from the exhaust branch to the outer surface of the substrate such that the initial flow of the gases over the substrate is generally tangential, with the outer wall having an inside surface which, together with the outer surface of the substrate, defines an annular gas flow passage circumscribing the outer surface of the substrate, with the area of the gas flow passage gradually decreasing as the circumferential distance from the transition increases, such that the exhaust gas moves radially inwardly through the substrate with approximately an even flow distribution.

In general, the inside surface of the outer wall of the cylindrical housing containing the primary catalyst substrate has a cochleate shape. According to another aspect of the present invention, a combination exhaust manifold catalyst reactor and muffler for an automotive internal combustion engine has not only the previously described primary catalyst, but also an exit structure adapted to conduct exhaust gases from the inner cavity of the primary catalyst substrate so that treated gases can be conveyed to the remainder of the vehicle's exhaust system. In a preferred embodiment, the exit structure may comprise a secondary catalyst with a generally cylindrical hollow substrate mounted within the inner cavity of the primary catalyst substrate such that exhaust flowing into the inner cavity of the primary substrate flows radially inwardly into the inner cavity of the secondary substrate, with the exit structure further comprising an exit tube for conducting exhaust gases from one end of the inner cavity of the secondary substrate to the exhaust system of the vehicle.

The primary and secondary catalyst substrates may comprise wound fiber cylinders having gas flow passages defined by the fiber windings. Such catalyst substrates are disclosed in U.S. Pat. No. 5,192,597 (Forsythe) which is hereby incorporated by reference into this specification.

As noted above, a wound fiber cylinder may be used for one or both of the catalytic substrates according to the present invention. The fiber windings may be placed at different spacings along the length of the secondary catalyst substrate such that the gas flow passages at the end of the secondary catalyst substrate which adjoins the exit tube are relatively more restrictive to gas flow than are the gas flow passages at the opposite end of the substrate. This will help to assure even flow of gases through the secondary substrate.

In order to assist in quicker light-off or warm-up of an exhaust manifold catalytic reactor and muffler, according to the present invention, the present device may further comprise a flow control valve located within the housing approximate the transition section, with the valve being situated such that with the valve open, exhaust gases will flow through the annular gas flow passage unimpeded, but with the valve closed, the exhaust gases will be forced to flow through a reduced portion of the substrate adjacent the transition section, with the result that the substrate will be quickly heated by the flowing exhaust gases.

It is an advantage of the present exhaust manifold catalyst and muffler that an engine equipped with this device will have reduced exhaust emissions at a lesser economic cost because of the elimination of separate componentry for the manifolding, catalysis, and muffling functions performed by this device.

DETAILED DESCRIPTION OF THE PREFERRED EMBODIMENTS

Figure 1:
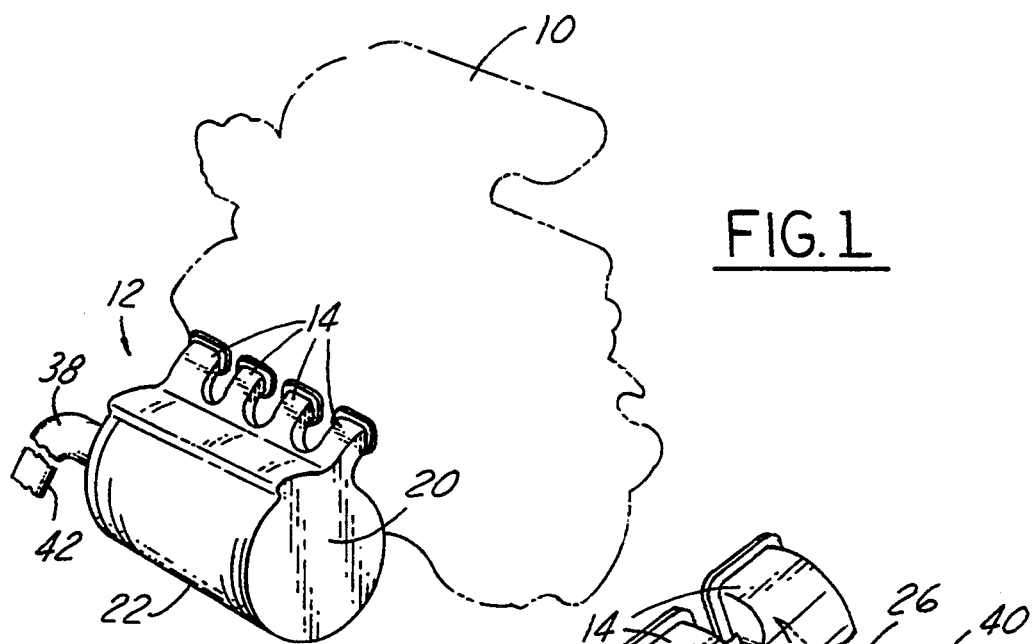
FIG. 1 is a perspective view of an exhaust manifold catalyst muffler according to the present invention, showing its attachment to an engine, which is depicted partially schematically.
Figure 2:
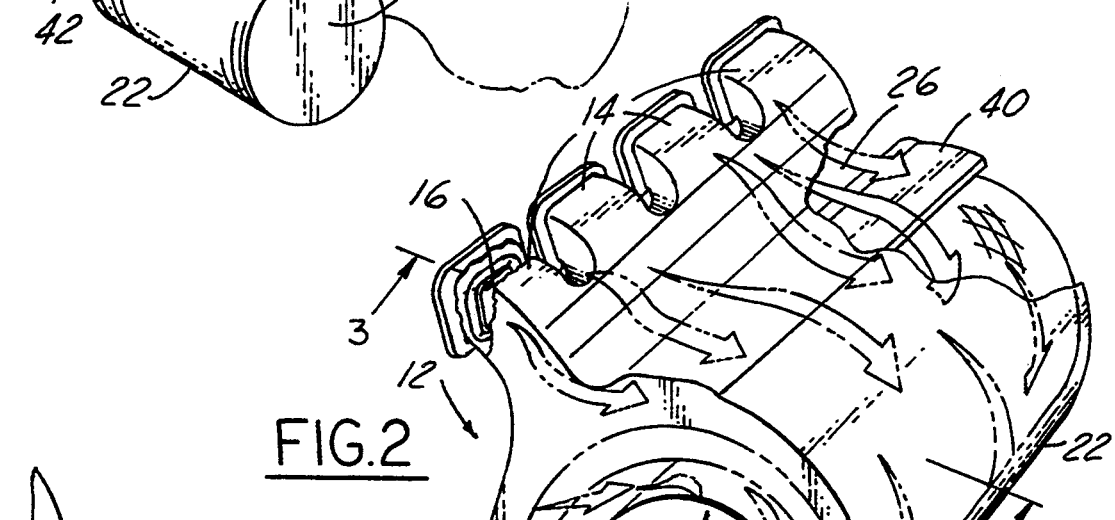
FIG. 2 is a cutaway perspective of an exhaust manifold catalyst muffler according to the present invention.

FIG. 1 illustrates an engine, 10, shown in phantom, having an exhaust manifold catalytic reactor and muffler according to the present invention. A device according to the present invention combines not only the function of an exhaust manifold but also that of a catalyst and an exhaust noise muffler. The inventive device is attached to the cylinder head of the engine and receives exhaust gases from a series of exhaust ports, with one port 16 being shown in FIG. 2. Those skilled in the art will appreciate in view of this disclosure that an exhaust manifold catalyst and muffler according to the present invention could be used with engines having varying numbers of cylinders and having in-line or V-type configurations. Exhaust gases leaving the engine through exhaust ports 16 first flow through a plurality of exhaust branches 14 which conduct exhaust gases from the cylinder head's exhaust ports to the remainder of the combination manifold reactor and muffler.

Treatment of exhaust gases catalytically within the inventive device is accomplished by means of a generally cylindrical primary catalyst 18 which has an outer surface 18a, an inner surface 18b, and an inner cavity 18c. Primary catalyst 18 is constructed such that exhaust gases are able to flow radially through the catalyst substrate. Because it is generally cylindrical, substrate 18 is amenable to packaging within a generally cylindrical housing 20, which is connected to exhaust branches 14. As used herein, the term "generally cylindrical" refers to a plurality of conic sections including not only right circular cylinders, but also cylinders having non-circular cross sections, such as oval or elliptical, or other sections. Those skilled in the art will appreciate in view of this disclosure that substrates chosen from these and other conic or non-conic sections could be used according to the present invention.

Housing 20 places the flowing exhaust gases in contact with substrate 18 so as to provide an opportunity for catalysis and muffling. The passage of exhaust gas through substrate 18 is governed at least in part by flow control valve 40, which is located within housing 20 proximate transition section 26, with valve 40 being situated such that with valve 40 open, exhaust gases will flow through annular gas flow passage 32 unimpeded, while with valve 40 closed, exhaust gases will be forced to flow through a reduced portion of substrate 18 adjacent transition section 26, with the result that substrate 18 will be quickly heated by the flowing exhaust gases. Valve 40 would likely be closed during cold engine operation, so as to hasten warming of the catalyst to a point at which conversion efficiency is acceptable to enable a vehicle equipped with the inventive device to meet requisite exhaust emission standards.

Figure 3:
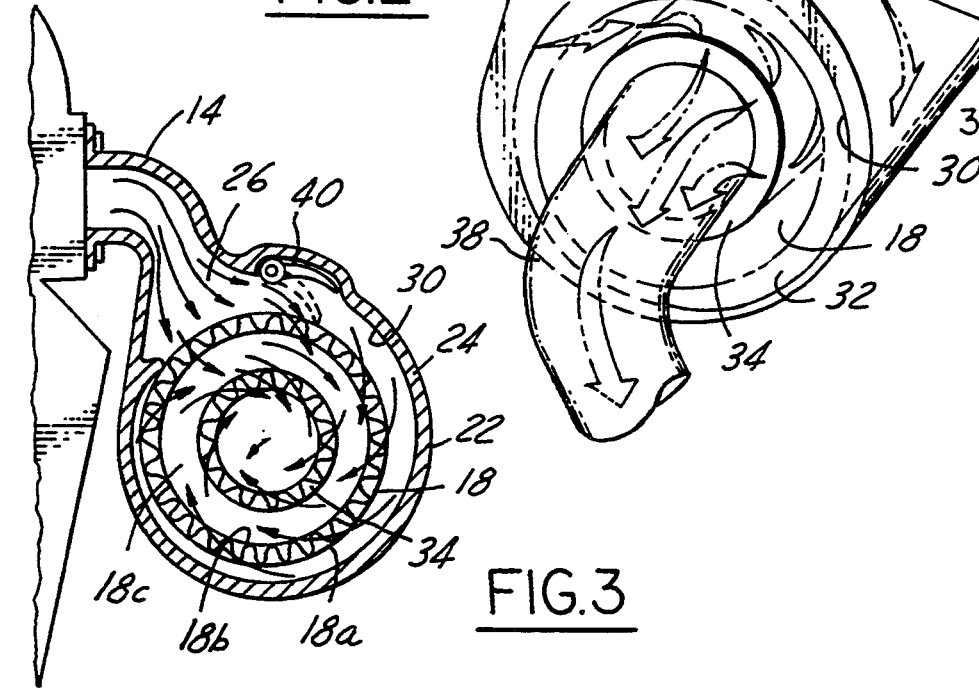
FIG. 3 is an end view of an exhaust manifold catalyst muffler according to the present invention, taken along the line 3—3 of FIG. 2.

In order to promote a flow characteristic through the present manifold catalyst and muffler which is marked by an even, radially inward flow through substantially the entire outer surface 18a of substrate 18, housing 20 has a generally cylindrical container 22 with an outer wall 24 having inside surface 30 which, together with outer surface 18a of substrate 18, defines an annular gas flow passage 32, which circumscribes the outer surface of substrate 18. As shown best in FIGS. 3, 5, and 6, inside surface 30 of outer wall 24 has a cochleate shape, which causes the shape of flow passage 32 to continuously decrease in size. In the example shown in FIG. 6, the outer diameter of primary substrate 18 is approximately 150 mm. At location A, flow passage 32 has a dimension extending between inside surface 30 and outer substrate surface 18a of about 22 mm, which decreases to approximately 7.6 mm at location B. Notice that following location B, the size of annular gas flow passage 32 is reduced markedly by means of flow guide 36. Flow guide 36 diminishes the amount of exhaust gas which flows from transition section 26 in a counterclockwise fashion, as viewed in FIG. 6. Rather, gases will be caused to flow clockwise in FIG. 6. This assures that the exhaust gases will flow evenly through substrate 18, so as to achieve high rates of catalytic and thermal conversion, accompanied by adequate muffling of exhaust noise. Although the flow has a tangential component which dominates at least initially, the exhaust gases generally flow radially inwardly with a relatively even distribution.

Gases flowing radially inward through surface 18b of primary substrate 18 flow into cavity 18c of substrate 18. Cavity 18c serves to allow expansion and sound dissipation of the exhaust gases, which must then be conducted from the manifold catalyst and muffler. For this purpose, an exit structure may be provided, as shown in FIGS. 2-6. The illustrated exit structure comprises secondary catalyst substrate 34, which is generally cylindrical and which has inner cavity 34c. Upon flowing into inner cavity 34c, the exhaust gases flow axially through the inner cavity and then out of exit tube 38, which conducts the exhaust gases to the remainder of the vehicle's exhaust system, which is shown schematically at 42 in FIG. 1. Expansion of the exhaust gases upon reaching inner cavity 18c is accompanied by a reduction in pressure, which in turn mitigates the sound energy.

It has been determined, as noted above, that each of the primary and secondary catalyst substrates may comprise a wound fiber cylinder having gas flow passages defined by the fiber windings. If this construction is used, the fiber windings may be placed at a varying density along the length of the secondary catalyst substrate, such that the gas flow passages in the end of the secondary catalyst which adjoins exit tube 38 are relatively more restrictive to the gas flow than are the gas flow passages at the opposite end of the secondary catalyst substrate. This will cause the gases to flow evenly through the wall of the secondary substrate.

Figure 4:
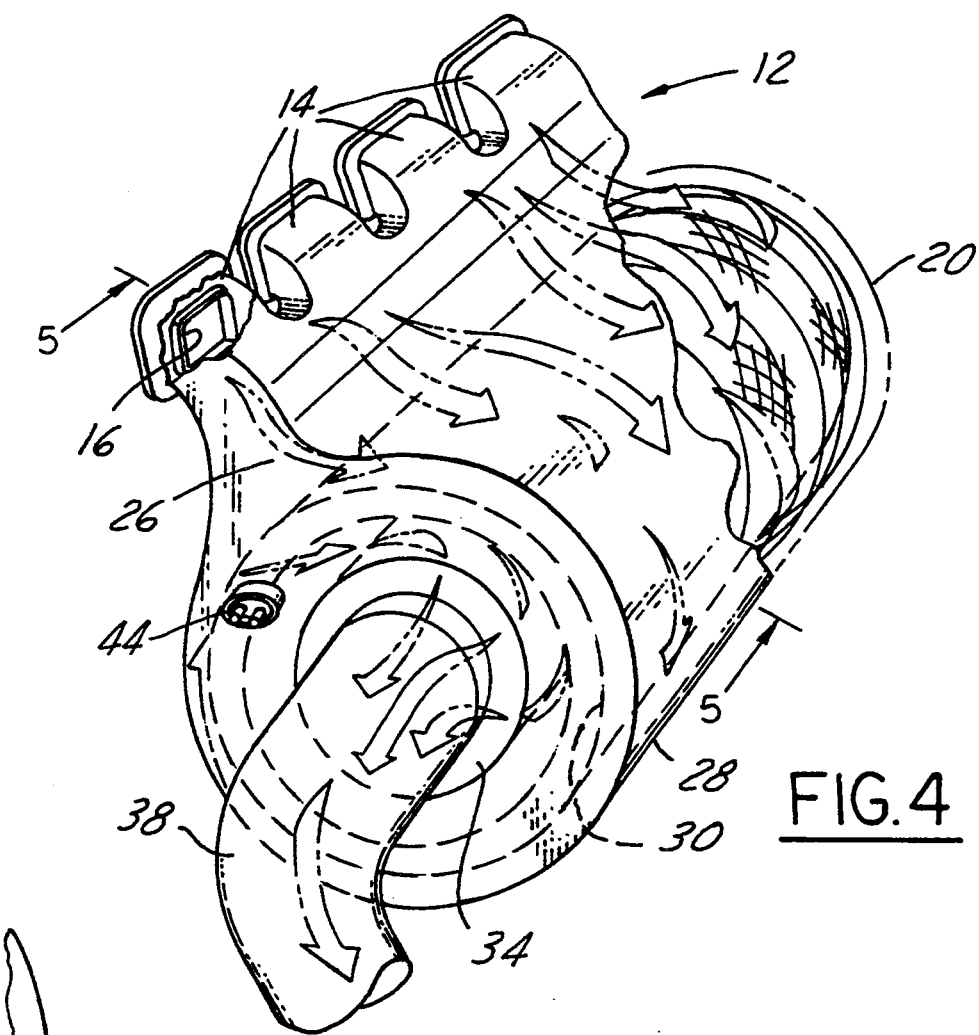
FIG. 4 is a perspective view of a second embodiment of an exhaust manifold catalyst muffler according to the present invention having an electrically heated outer or inner substrate.
Figure 5:
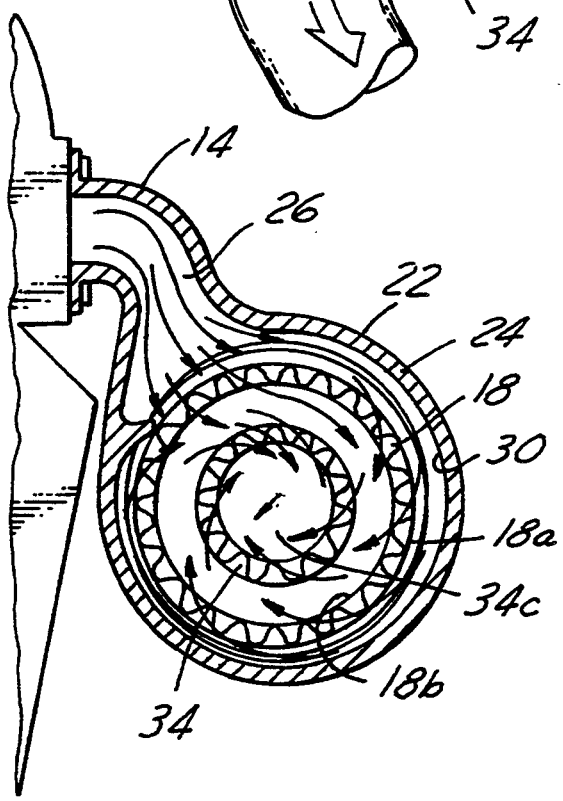
FIG. 5 is a sectional view of the embodiment of FIG. 4 taken along the line 5—5 of FIG. 4.
Figure 6:
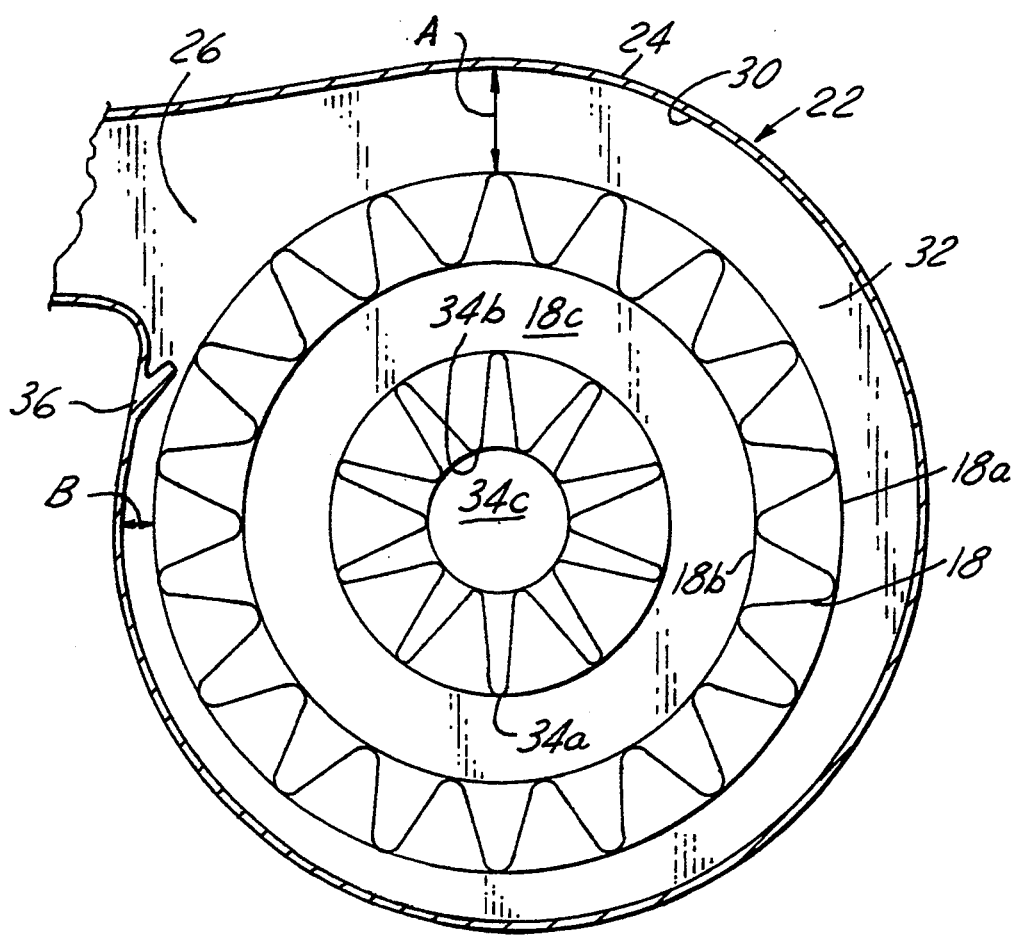
FIG. 6 is an enlarged partial sectional view of the exhaust manifold catalyst muffler of FIGS. 4 and 5.

With the embodiment of FIGS. 4 and 5, fast warming of substrate 18 is promoted by electrical resistance heating of the substrate. Electrical connector 44 is connected to a conventional electric catalyst heating system (not shown) chosen from any of the types known to those skilled in the art and suggested by this disclosure. Substrate 34 may be electrically heated as well.

While the invention has been shown and described in its preferred embodiments, it will be clear to those skilled in the arts to which it pertains that many changes and modifications may be made thereto without departing from the scope of the invention.

We claim:

1. An exhaust manifold catalytic reactor and muffler for an automotive internal combustion engine, comprising:
    at least one exhaust branch for conducting exhaust gases from a cylinder head exhaust port of an engine;
    a hollow, generally cylindrical primary catalyst substrate for treating the exhaust gases flowing from the engine with said substrate having inner and outer surfaces which are generally cylindrical and an inner cavity, and:

a housing, connected to said exhaust branch, for placing said exhaust gases in contact with said substrate, with said housing comprising a generally cylindrical container having an outer wall and a transition section for conducting exhaust gas from said exhaust branch to the outer surface of the substrate such that the initial flow of the gases over the substrate is generally tangential, with said outer wall having an inside surface which, together with the outer surface of the substrate, defines an annular gas flow passage circumscribing the outer surface of the substrate, with the area of the gas flow passage gradually decreasing as the circumferential distance from the transition increases such that the exhaust gas moves radially inwardly through the substrate with approximately an even flow distribution.

2. An exhaust manifold catalytic reactor and muffler according to claim 1, wherein the inside surface of said outer wall has a cochleate shape.

3. An exhaust manifold catalytic reactor and muffler according to claim 1, further comprising an exit structure adapted to conduct exhaust gases from the inner cavity of said substrate to the exhaust system of a vehicle.

4. An exhaust manifold catalytic reactor and muffler according to claim 3, wherein said exit structure comprises a secondary catalyst with a generally cylindrical, hollow substrate mounted within the inner cavity of said primary catalyst substrate such that exhaust flowing into the inner cavity of the primary substrate flows radially inwardly into the inner cavity of the secondary catalyst, with said exit structure further comprising an exit tube for conducting exhaust gases from one end of the inner cavity of the secondary substrate to the remainder of the exhaust system of a vehicle.

5. An exhaust manifold catalytic reactor and muffler according to claim 4, wherein the substrate of said secondary catalyst comprises a wound fiber cylinder having gas flow passages defined by the fiber windings.

6. An exhaust manifold catalytic reactor and muffler according to claim 5, wherein the fiber windings are placed at different spacings along the length of the substrate, such that the gas flow passages at the end of the secondary catalyst which adjoins said exit tube are relatively more restrictive to gas flow than are the gas flow passages at the opposite end of the substrate.

7. An exhaust manifold catalytic reactor and muffler according to claim 1, wherein the substrate of said primary catalyst comprises a wound fiber cylinder having gas flow passages defined by the fiber windings.

8. An exhaust manifold catalytic reactor and muffler according to claim 1, wherein the substrate of said primary catalyst is electrically heated.

9. An exhaust manifold catalytic reactor and muffler according to claim 1, further comprising a flow control valve located within said housing proximate said transition section, with said valve being situated such that with the valve open exhaust gases will flow through the annular gas flow passage unimpeded, but with the valve closed, exhaust gases will be forced to flow through a reduced portion of said substrate adjacent said transition section, with the result that the substrate will be quickly heated by the flowing exhaust gases.

10. An exhaust manifold catalytic reactor and muffler for an automotive internal combustion engine, comprising:

at least one exhaust branch for conducting exhaust gases from a cylinder head exhaust port of an engine;

a hollow, generally cylindrical primary catalyst substrate for treating the exhaust gases flowing from the engine with said substrate having inner and outer surfaces which are generally cylindrical and an inner cavity for allowing the exhaust gases to expand thereby dissipating sound energy, and:

a housing, connected to said exhaust branch, for placing said exhaust gases in contact with said substrate, with said housing comprising a generally cylindrical container having an outer wall and a transition section for conducting exhaust gas from said exhaust branch to the outer surface of the substrate such that the initial flow of the gases over the substrate is generally tangential, with said outer wall having a cochleate inside surface which, together with the outer surface of the substrate, defines an annular gas flow passage circumscribing the outer surface of the substrate, with the area of the gas flow passage gradually decreasing as the circumferential distance from the transition increases such that the exhaust gas moves radially inwardly through the substrate with approximately an even flow distribution.

11. An exhaust manifold catalytic reactor and muffler according to claim 10, further comprising an exit structure adapted to conduct exhaust gases from the inner cavity of said substrate to the remainder of a vehicle's exhaust system, with said exit structure comprising a secondary catalyst with a generally cylindrical, hollow substrate mounted within the inner cavity of said primary catalyst substrate such that exhaust flowing into the inner cavity of the primary substrate flows radially inwardly into the inner cavity of the secondary catalyst, with said exit structure further comprising an exit tube for conducting exhaust gases from one end of the inner cavity of the secondary substrate to the remainder of the vehicle's exhaust system.

12. An exhaust manifold catalytic reactor and muffler according to claim 10, wherein said substrates each comprise a wound fiber cylinder having gas flow passages defined by interstices between the fiber windings.

13. An exhaust manifold catalytic reactor and muffler according to claim 10, wherein the substrate of said primary catalyst is electrically heated.

14. An exhaust manifold catalytic reactor and muffler according to claim 11, wherein the substrate of said secondary catalyst is electrically heated.

15. An exhaust manifold catalytic reactor and muffler according to claim 11, wherein the substrates of said primary and secondary catalysts are electrically heated.

* * * * *